(12) United States Patent
Huang et al.

(10) Patent No.: US 7,933,115 B2
(45) Date of Patent: Apr. 26, 2011

(54) SCREEN SCRATCH RESISTANT DEVICE FOR LAPTOP COMPUTER

(75) Inventors: Shih-Hsiang Huang, Fengyuan (TW); Yu-Feng Huang, HsinChu (TW); Chih-Hsiang Chien, Banqiao (TW); Ying-Hsien Tseng, Taipei (TW)

(73) Assignee: Dell Products, LP, Round Rock, TX (US)

( * ) Notice: Subject to any disclaimer, the term of this patent is extended or adjusted under 35 U.S.C. 154(b) by 190 days.

(21) Appl. No.: 12/425,092

(22) Filed: Apr. 16, 2009

(65) Prior Publication Data

US 2010/0265647 A1 Oct. 21, 2010

(51) Int. Cl.
*G06F 1/16* (2006.01)
*G06F 3/02* (2006.01)
*H04M 1/00* (2006.01)

(52) U.S. Cl. ......... 361/679.26; 361/679.27; 361/679.55; 361/679.56; 345/168; 345/169; 455/575.1

(58) Field of Classification Search ............ 361/679.01–679.45, 679.55–679.59; 312/223.1, 312/223.2; 455/575.1; 345/156, 157, 168, 345/169; 174/50
See application file for complete search history.

(56) References Cited

U.S. PATENT DOCUMENTS

| 5,931,297 | A * | 8/1999 | Weill et al. ..................... 206/320 |
| 6,795,306 | B2 * | 9/2004 | Jeffries et al. ............ 361/679.27 |
| 7,232,960 | B2 * | 6/2007 | Matsumoto et al. .......... 174/544 |
| 7,245,484 | B2 * | 7/2007 | Langerhans et al. ...... 361/679.27 |
| 7,800,893 | B2 * | 9/2010 | Tracy et al. .............. 361/679.27 |
| 2003/0026071 | A1 | 2/2003 | Hood, III et al. |
| 2004/0022014 | A1 | 2/2004 | Jeffries et al. |
| 2006/0210094 | A1 | 9/2006 | Kuriakose |

* cited by examiner

*Primary Examiner* — Zachary M Pape
*Assistant Examiner* — Nidhi Desai
(74) *Attorney, Agent, or Firm* — Larson Newman & Abel, LLP

(57) ABSTRACT

A device includes a screen back cover, a screen protective cover frame, a roller, and a screen protective cover. The screen back cover is configured to mount a screen to a computer. The screen protective cover frame includes a roller chamber, and is configured to snap fit with the screen back cover. The roller is disposed within the roller chamber, and is configured to guide a battery of the computer and to inhibit the battery from being placed in physical communication with the screen when the battery is inserted into the computer. The screen protective cover is in physical communication with the screen protective cover frame, and is configured to hold the roller within the roller chamber.

20 Claims, 7 Drawing Sheets

US 7,933,115 B2

SCREEN SCRATCH RESISTANT DEVICE FOR LAPTOP COMPUTER

FIELD OF THE DISCLOSURE

This disclosure relates generally to information handling systems, and more particularly relates to a screen scratch resistant device for a laptop computer.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow for information handling systems to be general or configured for a specific user or specific use such as financial transaction processing, airline reservations, enterprise data storage, or global communications. In addition, information handling systems can include a variety of hardware and software components that can be configured to process, store, and communicate information and can include one or more computer systems, data storage systems, and networking systems.

In some laptop computers, the battery can form part of the cosmetic surface of a base of the laptop. In this situation, the liquid crystal display (LCD) screen and the battery rub each other while a user is loading or unloading the battery. Additionally, the gap between the LCD screen and the hinge cover area of the palmrest can be too small, such that the LCD and the hinge cover may rub against each other while the user is opening the hinge cover.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application.

Figure 1:
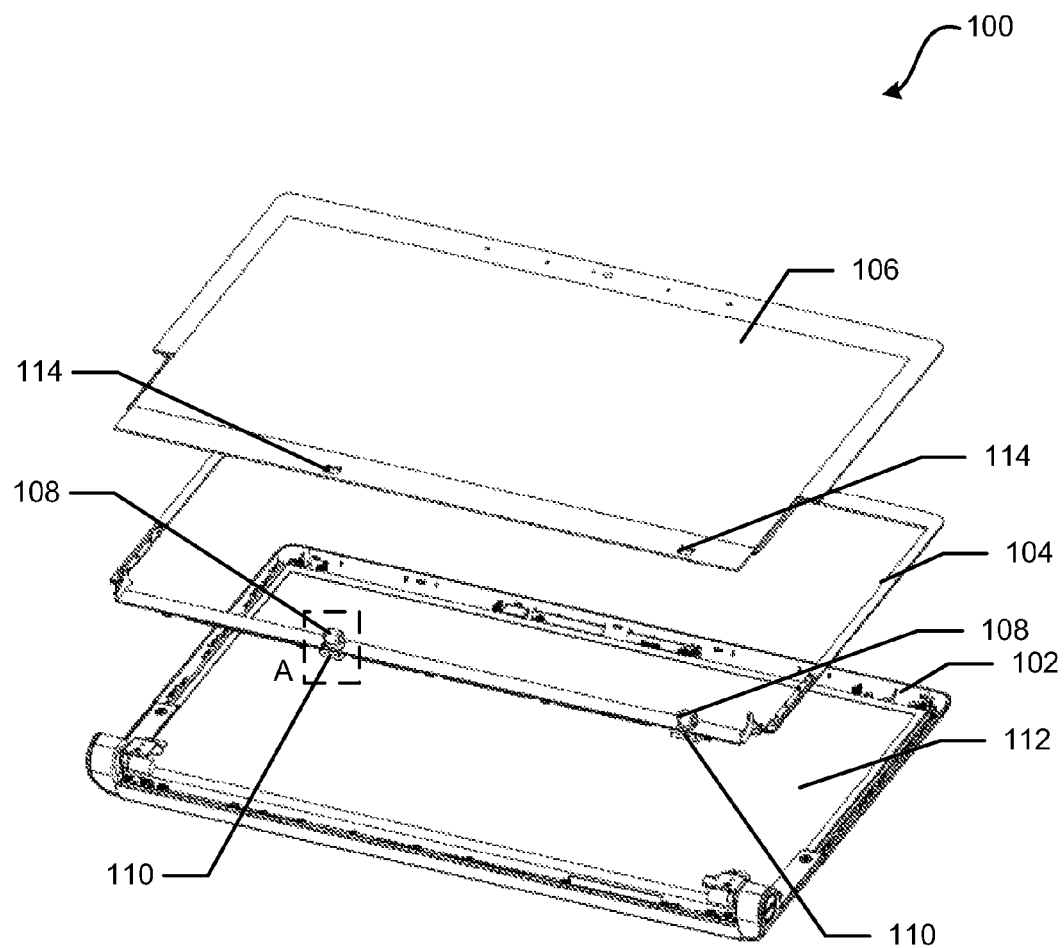
FIG. 1 is a schematic diagram of a screen support device.

FIG. 1 shows a screen support device 100 of an information handling system. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

The screen support device 100 includes a screen back cover 102, a screen protective cover frame 104, a screen protective cover 106, rollers 108, roller chambers 110, and a screen 112. The screen protective cover 106 includes roller interfaces 114. The screen back cover 102 can support the screen 112. The screen protective cover frame 104 is normally in physical communication with the screen back cover 102. The rollers 108 fit within the roller chambers 110, which in turn extend from the screen protective cover frame 104. The screen protective cover 106 is normally in physical communication with the screen protective cover frame 104, such that the roller interfaces 114 are aligned with the rollers 108.

Figure 2:
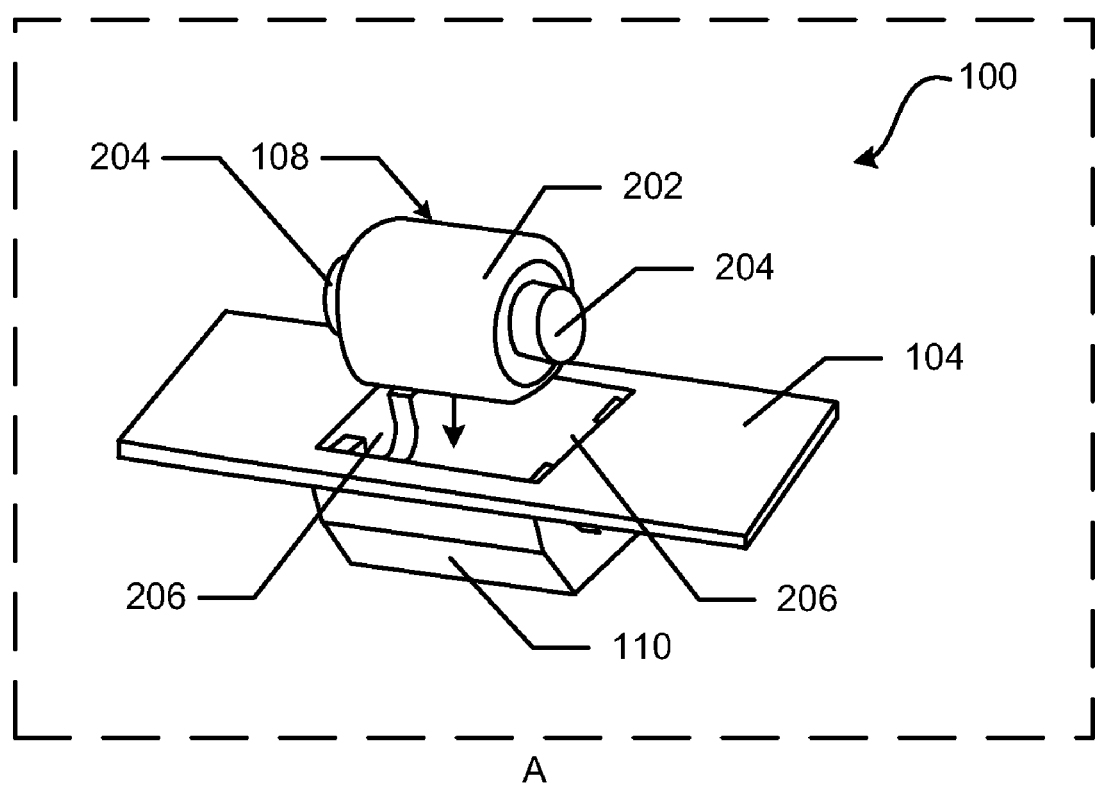
FIG. 2 is a schematic diagram of a portion of the screen support device.

The screen protective cover frame 104, the roller 108, and the roller chamber 110 of box 'A' are shown in greater detail in FIG. 2. The roller 108 preferably includes an exterior coating 202 and pegs 204. The roller chamber 110 preferably includes support cavities 206, such that the pegs 204 of the roller 108 slide within the support cavities as the roller is inserted into the roller chamber. As a device slides across the roller 108, the pegs 204 can rotate within the support cavities 206 and as a result the roller can rotate within the roller chamber 110.

Figure 3:
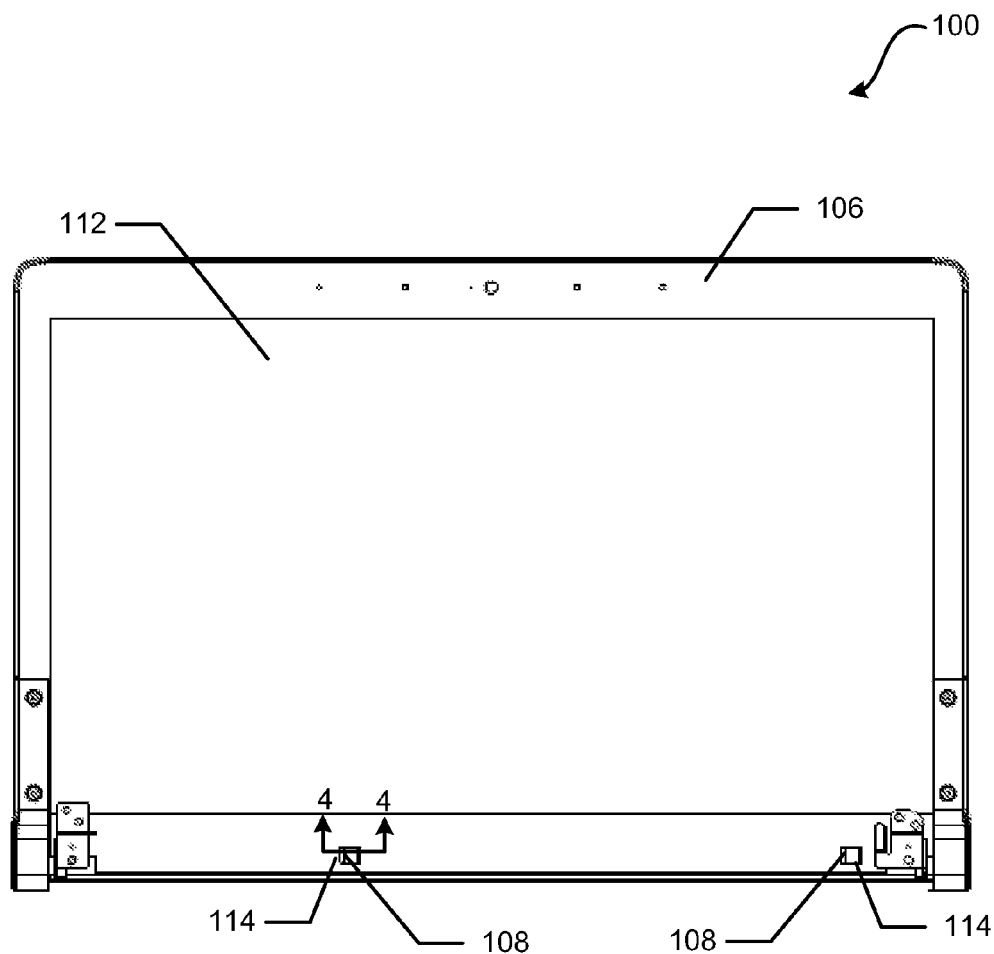
FIG. 3 is a schematic diagram of the screen support device assembled.

FIG. 3 shows the screen support device 100 assembled and capable of being mounted on a computer. The screen 112 connects within the screen back cover 102, and the screen protective cover frame 104 snap fits into the screen back cover. The rollers 108 slide into the roller chambers 110, and the screen protective cover 106 connects to the screen protective cover frame 104. The screen protective cover 106 can adhesively connect with the screen protective cover frame 104 to hold the roller 108 within roller chamber 110. The rollers 108 and the roller interfaces 114 preferably align with each other.

Figure 4:
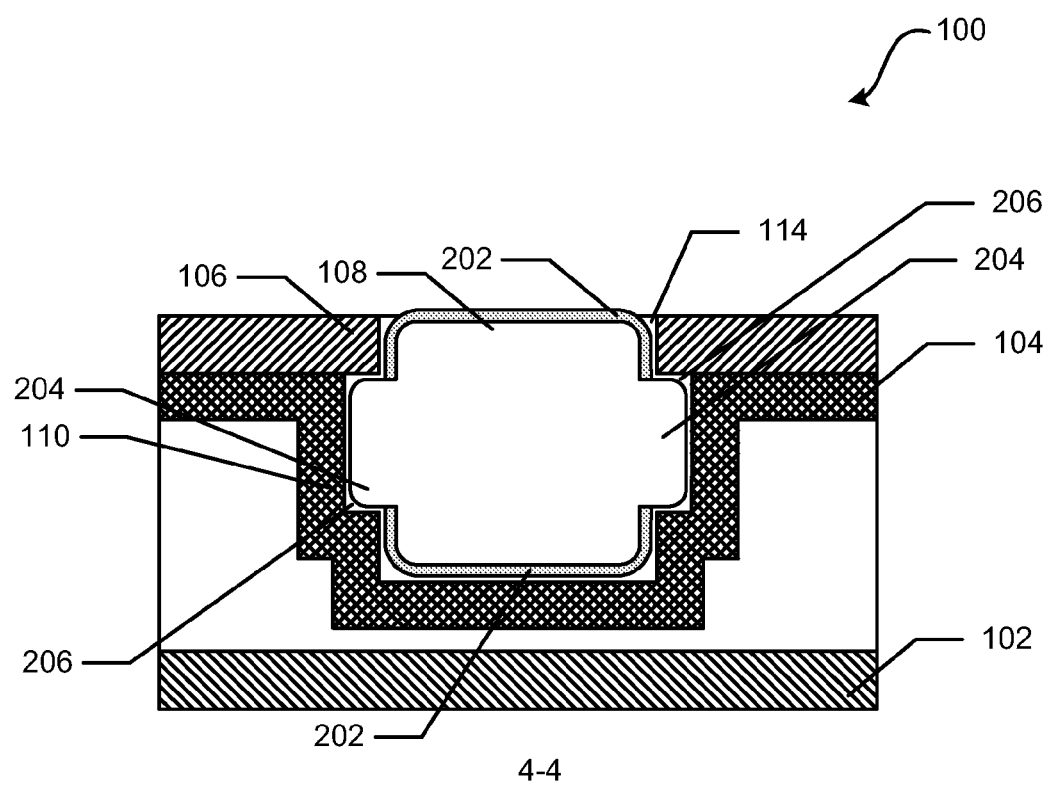
FIG. 4 is a schematic diagram of a cross section of the screen support device taken along line 4-4 in FIG. 3.

FIG. 4 shows the cross section of the screen support device 100 taken along the line 4-4 in FIG. 3. The screen protective cover frame 104 is connected to the screen back cover 102. The roller 108 is within the roller chamber 110, such that the pegs 204 rest within the support cavities 206. The screen protective cover 106 connects with the top of the screen protective cover frame 104 such that a portion of the roller 108, such as the exterior coating 202, extends through the roller interface 114 and beyond the top edge of the screen protective cover.

Figure 5:
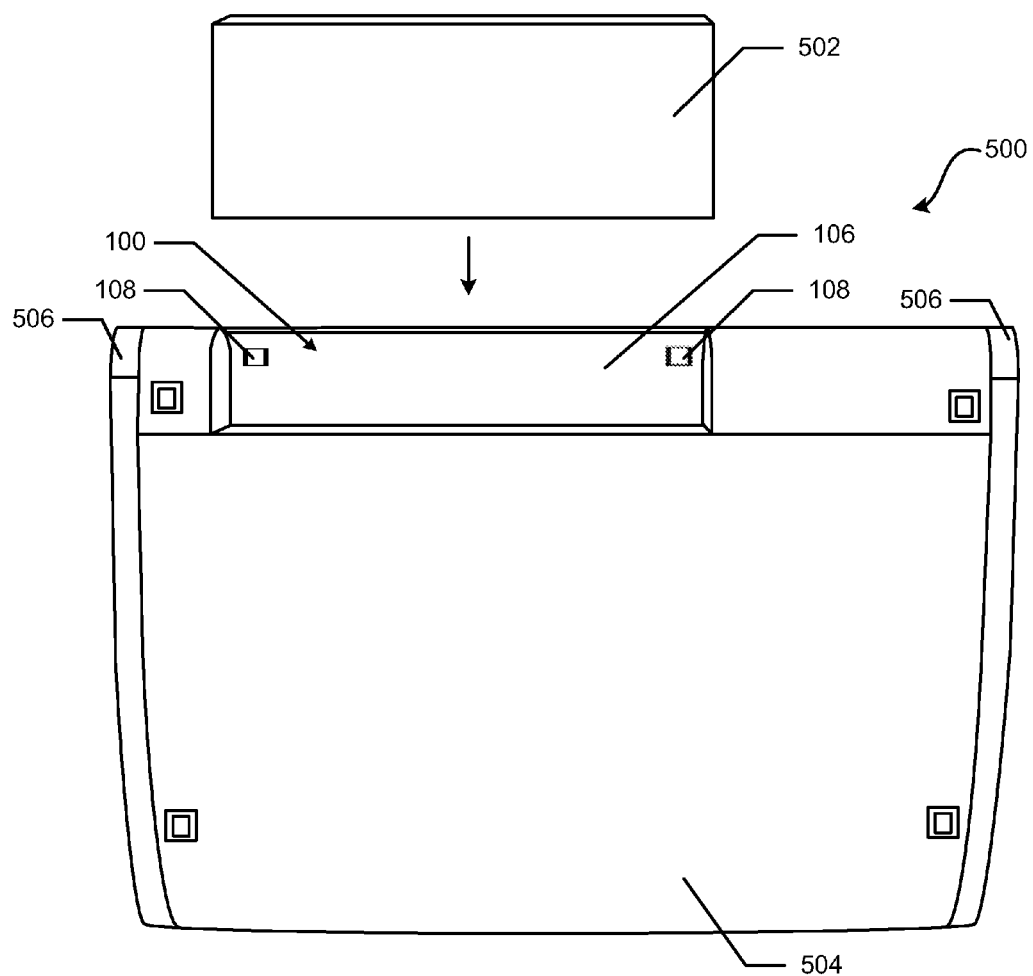
FIG. 5 is a schematic diagram of a computer and the screen support device.

FIG. 5 shows a computer 500 including the screen protective cover 106, the rollers 108, a battery 502, and a base 504. The screen support device 100 is connected to the base 504 via connectors 506. If the battery 502 is removed from the computer 500, the screen protective cover 106 and rollers 108 can be seen through the opening created by the missing battery. As the battery 502 is inserted into the base 504, the battery can form a portion of the base and can engage the portion of the rollers 108 extending beyond the surface of the screen protective cover 106.

The rollers 108 can absorb the weight of the battery 502 and/or pressure exerted onto the battery from a user inserting the battery into the computer 500. The rollers 108 can support the battery 502 so that the battery does not come into contact with and does not scratch the screen protective cover 106 of the screen support device 100 as the battery is inserted into the computer 500. The exterior coating 202 of the rollers 108, shown in FIGS. 2 and 4, can provide a soft surface for the battery 502 to come in contact with as the battery is inserted into the base 504. As a result, the exterior coating 202 can prevent scratching of the battery. Upon the battery 502 being installed within the computer 500, the rollers 108 can complete the gap between the screen protective cover 106 and the base 504. Thus, if a user picks up the computer 500, the rollers 108 can provide a secure support such that the screen support device 100 does not buckle toward the base 504. Additionally, the exterior coating 202 of the rollers 108 can inhibit scratching of the battery 502 and/or the screen protective cover 106 as the battery is removed from the computer 500.

Figure 6:
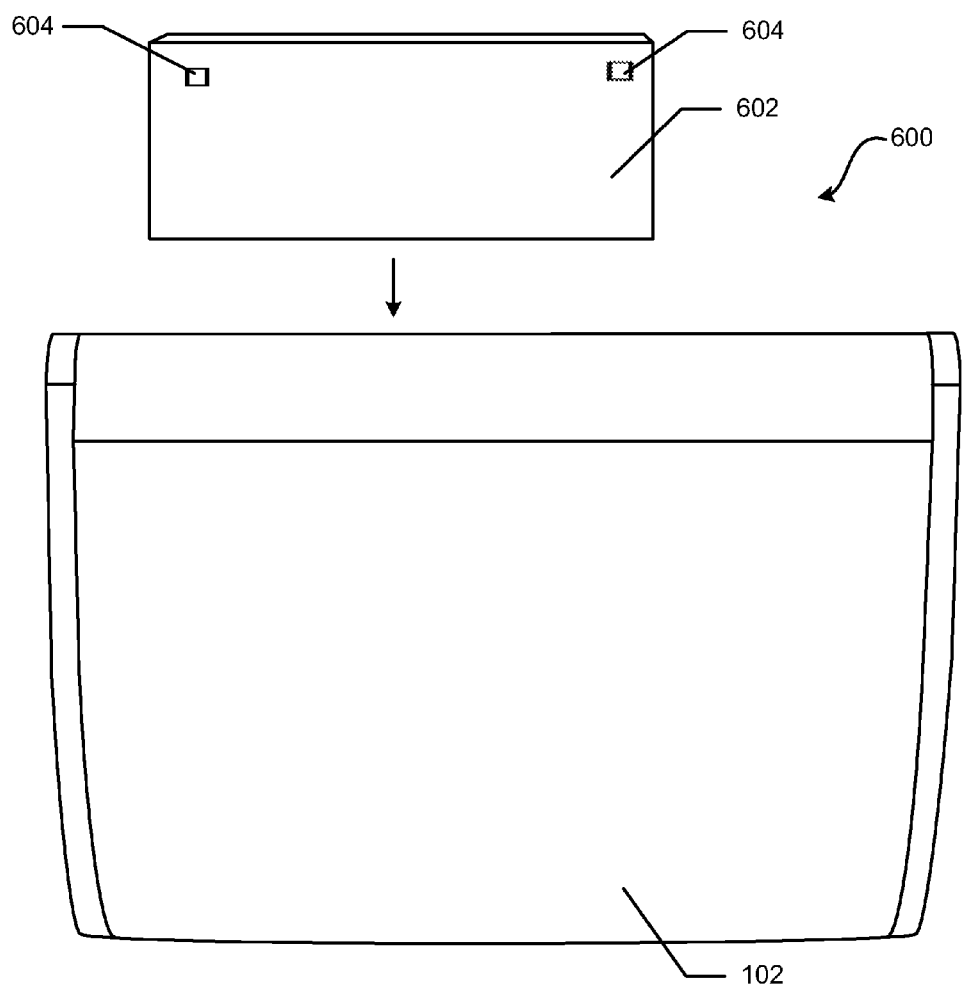
FIG. 6 is a schematic diagram of an alternative embodiment of the computer and screen support device.

FIG. 6 shows another embodiment of a computer 600 including the screen back cover 102, the battery 602, and rollers 604. In this embodiment, the rollers 604 can be located on the battery 602 similar to that of the screen protective cover frame 104 discussed above. The rollers 604 can also engage the computer 600 such that the rollers support and guide the battery into the computer as discuss above. Therefore, the rollers 604 can prevent scratching of the battery 602 and/or the screen support device 100.

Figure 7:
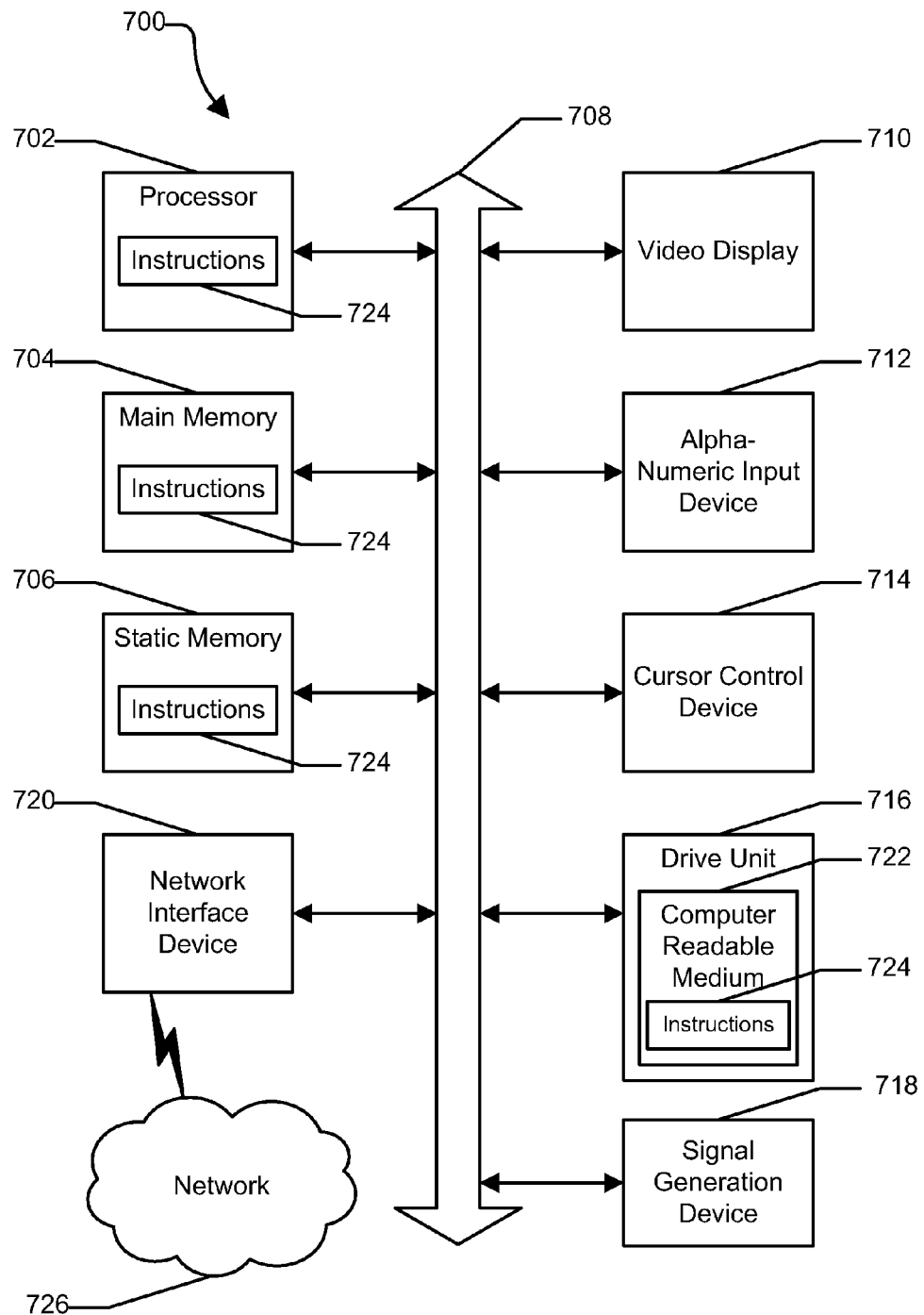
FIG. 7 is a block diagram of a general computer system.

FIG. 7 shows an illustrative embodiment of a general computer system 700 in accordance with at least one embodiment of the present disclosure. The computer system 700 can include a set of instructions that can be executed to cause the computer system to perform any one or more of the methods or computer based functions disclosed herein. The computer system 700 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 700 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 700 can be implemented using electronic devices that provide voice, video or data communication. Further, while a single computer system 700 is illustrated, the term "system" shall also be taken to include any collection of systems or sub-systems that individually or jointly execute a set, or multiple sets, of instructions to perform one or more computer functions.

The computer system 700 may include a processor 702, e.g., a central processing unit (CPU), a graphics processing unit (GPU), or both. Moreover, the computer system 700 can include a main memory 704 and a static memory 706 that can communicate with each other via a bus 708. As shown, the computer system 700 may further include a video display unit 710, such as a liquid crystal display (LCD), an organic light emitting diode (OLED), a flat panel display, a solid state display, or a cathode ray tube (CRT). Additionally, the computer system 700 may include an input device 712, such as a keyboard, and a cursor control device 714, such as a mouse. The computer system 700 can also include a disk drive unit 716, a signal generation device 718, such as a speaker or remote control, and a network interface device 720.

In a particular embodiment, as depicted in FIG. 7, the disk drive unit 716 may include a computer-readable medium 722 in which one or more sets of instructions 724, e.g. software, can be embedded. Further, the instructions 724 may embody one or more of the methods or logic as described herein. In a particular embodiment, the instructions 724 may reside completely, or at least partially, within the main memory 704, the static memory 706, and/or within the processor 702 during execution by the computer system 700. The main memory 704 and the processor 702 also may include computer-readable media. The network interface device 720 can provide connectivity to a network 726, e.g., a wide area network (WAN), a local area network (LAN), or other network.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 724 or receives and executes instructions 724 responsive to a propagated signal, so that a device connected to a network 726 can communicate voice, video or data over the network 726. Further, the instructions 724 may be transmitted or received over the network 726 via the network interface device 720.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A device comprising: a screen back cover mounting a screen to a computer; a screen protective cover frame including a roller chamber, the screen protective cover frame snap fitting with the screen back cover; a roller disposed within the roller chamber, the roller guiding a battery of the computer and inhibiting the battery from being placed in physical communication with the screen when the battery is inserted into the computer; and a screen protective cover in physical communication with the screen protective cover frame, the screen protective cover holding the roller within the roller chamber.

2. The device of claim 1 wherein the screen protective cover further includes:
   a roller interface configured to enable the roller to engage the battery.

3. The device of claim 1 wherein the roller is further configured to support the screen upon the computer being held at a location of the roller.

4. The device of claim 1 wherein the roller further includes pegs configured to enable the roller to roll within the first and second roller chambers.

5. The device of claim 4 wherein the roller chamber further include support cavities configured to receive and hold the pegs of the roller.

6. The device of claim 1 wherein the roller is coated with a soft material.

7. The device of claim 1 wherein the screen protective cover is adhesively connected to the screen protective cover frame.

8. A device comprising: a screen; a screen back cover mounting the screen to a computer; a screen protective cover frame including first and second roller chambers, the screen protective cover frame snap fitting with the screen back cover;
   a first roller disposed within the first roller chamber, the first roller guiding a battery of the computer and inhibiting the battery from being placed in physical communication with the screen when the battery is inserted into the computer; a second roller disposed within the second roller chamber, the second roller guiding the battery of the computer and inhibiting the battery from being placed in physical communication with the screen when the battery is inserted into the computer; and a screen protective cover in physical communication with the screen protective cover frame, the screen protective cover holding the first and second rollers within the first and second roller chambers.

9. The device of claim 8 wherein the screen protective cover further includes:
   a first roller interface configured to enable the first roller to engage the battery; and
   a second roller interface configured to enable the second roller to engage the battery.

10. The device of claim 8 wherein the first and second rollers are further configured to support the screen upon the computer being held at a location of the first and second rollers.

11. The device of claim 8 wherein the first and second rollers further include pegs configured to enable the first and second rollers to roll within the first and second roller chambers.

12. The device of claim 11 wherein the first and second roller chambers further include support cavities configured to receive and hold the pegs of the first and second rollers.

13. The device of claim 8 wherein the first and second rollers are coated with a soft material.

14. The device of claim 8 wherein the screen protective cover is adhesively connected to the screen protective cover frame.

15. A device comprising: a screen; a battery; a screen back cover mounting the screen to a computer; a screen protective cover frame including first and second roller chambers, the screen protective cover frame snap fitting with the screen back cover; a first roller disposed within the first roller chamber, the first roller guiding the battery of the computer and inhibiting the battery from being placed in physical communication with the screen when the battery is inserted into the computer; a second roller disposed within the second roller chamber, the second roller guiding the battery of the computer and inhibiting the battery from being placed in physical communication with the screen when the battery is inserted into the computer; and a screen protective cover in physical communication with the screen protective cover frame, the screen protective cover holding the first and second rollers within the first and second roller chambers.

16. The device of claim 15 wherein the screen protective cover further includes:
   a first roller interface configured to enable the first roller to engage the battery; and
   a second roller interface configured to enable the second roller to engage the battery.

17. The device of claim 15 wherein the first and second rollers are further configured to support the screen upon the computer being held at a location of the first and second rollers.

18. The device of claim 15 wherein the first and second rollers further include pegs configured to enable the first and second rollers to roll within the first and second roller chambers.

19. The device of claim 18 wherein the first and second roller chambers further include support cavities configured to receive and hold the pegs of the first and second rollers.

20. The device of claim 15 wherein the first and second rollers are coated with a soft material.

* * * * *